United States Patent
Leidner et al.

(10) Patent No.: US 10,262,283 B2
(45) Date of Patent: Apr. 16, 2019

(54) METHODS AND SYSTEMS FOR GENERATING SUPPLY CHAIN REPRESENTATIONS

(71) Applicant: Thomson Reuters Global Resources, Baar (CH)

(72) Inventors: Jochen Lothar Leidner, Zug (CH); Ole Siig, Schwyz (CH)

(73) Assignee: Thomson Reuters Global Resources Unlimited Company, Baar (CH)

( * ) Notice: Subject to any disclaimer, the term of this patent is extended or adjusted under 35 U.S.C. 154(b) by 1365 days.

(21) Appl. No.: 13/795,022

(22) Filed: Mar. 12, 2013

(65) Prior Publication Data

US 2014/0278706 A1 Sep. 18, 2014
US 2017/0213172 A9 Jul. 27, 2017

Related U.S. Application Data

(63) Continuation-in-part of application No. 12/628,426, filed on Dec. 1, 2009, and a continuation-in-part of application No. 13/423,127, filed on Mar. 16, 2012, and a continuation-in-part of application No. 13/423,134, filed on Mar. 16, 2012, and a continuation-in-part of application No. 13/594,864, filed on Aug. 26, 2012, now abandoned.

(51) Int. Cl.
*G06Q 10/06* (2012.01)

(52) U.S. Cl.
CPC .............................. *G06Q 10/06315* (2013.01)

(58) Field of Classification Search
CPC .............................................. G06Q 10/06315
See application file for complete search history.

(56) References Cited

U.S. PATENT DOCUMENTS 7,809,370 B2   10/2010  Stolte et al.
2003/0023466 A1  1/2003  Harper
(Continued)

OTHER PUBLICATIONS

Peter G.P. Walters, Adding value in global B2B supply chains: Strategic directions and the role of the Internet as a driver of competitive advantage, Available online Oct. 24, 2007, Industrial Marketing Management 37 (2008) 59-68.*
(Continued)

*Primary Examiner* — Andre D Boyce
(74) *Attorney, Agent, or Firm* — Duncan Galloway Egan Greenwald, PLLC; Kevin T. Duncan (57) ABSTRACT

A computer implemented method for mining supply chain information to produce supply chain graphs includes receiving by a computer a set of data; identifying a supplier, a commodity, and a customer from the set of data; generating a query comprising the identified data; determining the absence of any of the supplier, the commodity, or the customer from the set of data; if any items are determined to be absent from the set of data, substituting a placeholder for the missing item from the data set; sending the query; receiving a set of supply chain graph information; generating a supply chain graph signal based upon the set of supply chain graph information; and transmitting the supply chain graph signal. A computing device or system includes a processor an electronic memory; and a program for mining supply chain information to produce supply chain graphs stored in the electronic memory.

13 Claims, 8 Drawing Sheets

(56) References Cited

U.S. PATENT DOCUMENTS

| | | | |
|---|---|---|---|
| 2003/0236768 A1* | 12/2003 | Sribhibhadh | G06Q 10/06 |
| 2005/0021425 A1* | 1/2005 | Casey | G06Q 10/08 |
| | | | 705/28 |
| 2005/0119923 A1 | 6/2005 | Ladonnikov et al. | |
| 2008/0088485 A1 | 4/2008 | Stolte et al. | |
| 2010/0106660 A1 | 4/2010 | Farmer et al. | |
| 2010/0153870 A1* | 6/2010 | Hoffmann | G06Q 10/06 |
| | | | 715/767 |
| 2011/0215948 A1 | 9/2011 | Borgerson et al. | |
| 2012/0005190 A1* | 1/2012 | Faerber | G06F 17/30404 |
| | | | 707/718 |
| 2014/0019471 A1* | 1/2014 | Linton | G06N 5/02 |
| | | | 707/759 |

OTHER PUBLICATIONS

Dmitri Roussinov et al, Combining Information Seeking Services into a Meta Supply Chain of Facts, Journal of the Association for Information Systems, Apr. 1, 2008, vol. 9, Issue 3/4, pp. 175-199, Special Issue 2008.*

* cited by examiner

METHODS AND SYSTEMS FOR GENERATING SUPPLY CHAIN REPRESENTATIONS

CROSS REFERENCE TO RELATED APPLICATION

The present application claims benefit of priority to and is a continuation-in-part of U.S. patent application Ser. No. 12/628,426, filed Dec. 1, 2009, and entitled METHOD AND APPARATUS FOR RISK MINING (Leidner et. al.); U.S. patent application Ser. No. 13/423,127, filed Mar. 16, 2012, and entitled METHODS AND SYSTEMS FOR RISK MINING AND FOR GENERATING ENTITY RISK PROFILES (Leidner et. al.); U.S. patent application Ser. No. 13/423,134, filed Mar. 16, 2012, and entitled METHODS AND SYSTEMS FOR GENERATING ENTITY RISK PROFILES AND FOR PREDICTING BEHAVIOR OF SECURITY (Leidner et al.); U.S. patent application Ser. No. 13/594,864, filed Aug. 26, 2012, and entitled METHODS AND SYSTEMS FOR MANAGING SUPPLY CHAIN PROCESSES AND INTELLIGENCE (Siig et. al.); all of which are hereby incorporated by reference herein in their entirety.

FIELD OF THE INVENTION

This invention generally relates to mining and intelligent processing of data collected from content sources, e.g., in areas of financial services and risk management. More specifically, this invention relates to identifying suppliers and customers of specific commodities and generating visual representations of the relationships between the entities.

BACKGROUND OF THE INVENTION

Vendors ("shippers") supply goods to manufactures and/or service providers ("consignees"), which in turn become vendors delivering goods and/or services to further parties. The relationship of goods, often in the form of commodities, and the shippers and consignees forms a supply chain. One method of representing such a supply chain is in the form of a supply chain graph. Companies often lack an explicit graph representation of their own supply chain. Companies may lack sufficient data on incoming vendor and outgoing customer relationships to form a supply chain graph. Additionally, often such supply chain information is a closely guarded company secret, making such data inaccessible to third parties. A company would greatly benefit from knowing its competitors' supply chain information. Access to competitors' supply chain information allows a company to generate a supply chain representation or graph to illustrate and convey a robust and comprehensive understanding of current market risks and opportunities. Analysts can use supply chain graphs to better understand risk exposure implied in a given supply chain. For example, if Apple Corporation relies on lithium batteries to power its mobile computing devices, then a lack of lithium production in the mines where the element originates could lead to a bottleneck in Apple's product supplies, leading to revenue loss, and it could lead to the market price for lithium going up, thus cutting into the margin of devices sold. Both of these effects could directly or indirectly lead to a loss of profits for Apple and its shareholders as well as component suppliers.

Currently, in the context of supply chain management risk alerts with respect to entities and activities are known but are largely untimely and ineffective. Although companies may have access to internal data for the use in generating supply chain graphs for activities within the company, there is currently no effective process for accessing and analyzing data sources or utilities that a company can use to obtain or generate competitors' supply chain graphs. While data is available which may help a company assess current market risks and conditions, a complete and readily accessible data set is not available for a company wishing to analyze the supply chains of other companies. Also, there is no mechanism to arrive at a comprehensive supply chain representation across an industry or other select grouping of concerns. In order to perform a meaningful assessment of current and future market conditions, it is often necessary to compile not only sufficient information, but information of the proper type to formulate an accurate judgment as to whether the information constitutes a risk. Without the ability to access and assimilate a variety of different information sources, and particularly from a sufficient number and type of information sources, into a complete supply chain graph, the identification, assessment and communication of potential risks is significantly hampered. Currently, gathering of supply chain information is performed manually, resulting in inefficiencies and delays, and lacks defined criteria and processes for mining meaningful information to provide a clear picture of the supply chains of others in the market. The invention relates broadly to supply chain visual representations ("visualizations"). For purposes of explaining the applications of the invention in the discussion herein uses the term "graph" as illustrative of a common and preferred form of visual representation. However, the invention is not limited to graphical representation.

With the advents of the printing press, typeset, typewriting machines, computer-implemented word processing and mass data storage, the amount of information generated by mankind has risen dramatically and with an ever quickening pace. As a result of the growing and divergent sources of supply chain information, there is far more information available for creating supply chain visualizations, however manual processing of documents and the content therein is not possible or desirable. Accordingly, there exists a growing need to collect and store, identify, track, classify and catalogue, and process this growing sea of supply chain information/content and to deliver value added service to facilitate informed use of the data and predictive patterns derived from such supply chain information. Due to the development and widespread deployment of and accessibility to high speed networks, e.g., Internet, there exists a growing need to adequately and efficiently process the growing volume of content available on such networks to assist in decision making. In particular the need exists to quickly process information pertaining to supplier/commodity/customer relationships and events that may have an impact (positive or negative) on such relationships and commodity availability and flow so as to enable informed decision making in light of the effect of events and performance, including predicting the effect such events may have on pricing and availability of commodities in a supply chain.

In many areas and industries, including financial services sector, for example, there are content and enhanced experience providers, such as The Thomson Reuters Corporation, Wall Street Journal, Dow Jones News Service, Bloomberg, Financial News, Financial Times, News Corporation, Zawya, and New York Times. Such providers identify, collect, analyze and process key data for use in generating content, such as reports and articles, for consumption by professionals and others involved in the respective industries, e.g., financial consultants and investors. In one manner of content delivery, these financial news services provide financial news feeds, both in real-time and in archive, that include articles and other reports that address the occurrence of recent events that are of interest to investors. Many of these articles and reports, and of course the underlying events, may have a measureable impact on the pricing and availability of commodities. For example, a company may issue a press release that it (as supplier) has entered into an agreement with an other company (customer) to supply that company with a certain quantity of commodities, goods, or services (commodity). Professionals and providers in the various sectors and industries continue to look for ways to enhance content, data and services provided to subscribers, clients and other customers and for ways to distinguish over the competition. Such providers strive to create and provide enhance tools, including search and visualization tools, to enable clients to more efficiently and effectively process information and make informed decisions.

Advances in technology, including database mining and management, search engines, linguistic recognition and modeling, provide increasingly sophisticated approaches to searching and processing vast amounts of data and documents, e.g., database of news articles, financial reports, blogs, SEC and other required corporate disclosures, legal decisions, statutes, laws, and regulations, that may affect business performance, including pricing and availability of commodities. Investment and other financial professionals and other users increasingly rely on mathematical models and algorithms in making professional and business determinations. Especially in the area of investing, systems that provide faster access to and processing of (accurate) news and other information related to corporate operations performance will be a highly valued tool of the professional and will lead to more informed, and more successful, decision making Information technology and in particular information extraction (IE) are areas experiencing significant growth to assist interested parties to harness the vast amounts of information accessible through pay-for-services or freely available such as via the Internet.

Many financial services providers use "news analysis" or "news analytics," which refer to a broad field encompassing and related to information retrieval, machine learning, statistical learning theory, network theory, and collaborative filtering, to provide enhanced services to subscribers and customers. News analytics includes the set of techniques, formulas, and statistics and related tools and metrics used to digest, summarize, classify and otherwise analyze sources of information, often public "news" information. An exemplary use of news analytics is a system that digests, i.e., reads and classifies, financial information to determine market impact related to such information while normalizing the data for other effects. News analysis refers to measuring and analyzing various qualitative and quantitative attributes of textual news stories, such as that appear in formal text-based articles and in less formal delivery such as blogs and other online vehicles. More particularly, the present invention concerns analysis in the context of electronic content. Expressing, or representing, news stories as "numbers" or other data points enables systems to transform traditional information expressions into more readily analyzable mathematical and statistical expressions and further into useful data structures and other work product. News analysis techniques and metrics may be used in the context of finance and more particularly in the context of investment performance—past and predictive.

News analytics systems may be used to measure and predict: volatility of commodity pricing and volatility and effects on markets; reversals of news impact; the relevance of risk-related words in annual reports for predicting negative or positive impact; and the impact of news stories on commodities. News analytics often views information at three levels or layers: text, content, and context. Many efforts focus on the first layer—text, i.e., text-based engines/applications process the raw text components of news, i.e., words, phrases, document titles, etc. Text may be converted or leveraged into additional information and irrelevant text may be discarded, thereby condensing it into information with higher relevance/usefulness. The second layer, content, represents the enrichment of text with higher meaning and significance embossed with, e.g., quality and veracity characteristics capable of being further exploited by analytics. Text may be divided into "fact" or "opinion" expressions. The third layer of news analytics—context, refers to connectedness or relatedness between information items. Context may also refer to the network relationships of news.

There are known methods for the preprocessing of data, entity extraction, entity linking, indexing of data, and for indexing ontologies. For example U.S. Pat. No. 7,333,966, entitled "SYSTEMS, METHODS, AND SOFTWARE FOR HYPERLINKING NAMES", U.S. Pat. Pub. 2009/0198678, entitled "SYSTEMS, METHODS, AND SOFTWARE FOR ENTITY RELATIONSHIP RESOLUTION", U.S. patent application Ser. No. 12/553,013, entitled "SYSTEMS, METHODS, AND SOFTWARE FOR QUESTION-BASED SENTIMENT ANALYSIS AND SUMMARIZATION", U.S. Pat. Pub. 2009/0327115, entitled "FINANCIAL EVENT AND RELATIONSHIP EXTRACTION", and U.S. Pat. Pub. 2009/0222395, entitled "ENTITY, EVENT, AND RELATIONSHIP EXTRACTION", the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources.

What is needed is a system capable of automatically processing, parsing, or "reading" news stories, press releases, regulatory and other filings, and other content and sources of information available to it and quickly interpreting the content to identify individual data elements necessary to automatically generate a complete supply chain visualization. Presently, there exists a need to utilize and leverage media and other sources of entity information and a need for advanced analytics relevant to corporate performance, commodity availability and price behavior, investing, and awareness to generate supply chain visualizations. Given the vast amount of news, legal, regulatory and other entity-related information based on text, content and context, investors, corporations, and those involved in financial services have a persistent need and desire for an understanding of how such vast amounts of information, even processed information, relates to the movement of goods, services, and other commodities through supply chains of markets, industries, companies and competitors.

SUMMARY OF THE INVENTION

It has been recognized that there exists a need for a system that can collect supply chain information from sources, including structured and unstructured sources, and then utilize the collected supply chain information to generate supply chain visualizations, models of supply chain relationships, and predictive supply chain risk models. To address the shortcomings of existing systems and methods and to satisfy the present and long-felt need in the marketplace, the present invention provides users with enhanced data, analytics, and business intelligence, which may be in the form of visual representations of collected supply chain information in the form of supply chain graphs, as tools and resources in performing business functions and in making business decisions. Furthermore, by providing users, such as corporations, and business/investment analysts, with information concerning the flow, or disruption in the flow, availability, and pricing fluctuation of commodities in the global supply chain, the system empowers the users to analyze and make informed decisions.

The present invention may also be used to identify inefficiencies, potential risks, and opportunities that exist in a market. The system may also be used to streamline or improve the existing supply chains and logistics within a corporation.

The present invention disclosed herein solves the problem of a lack of supply chain information by mining it from sources, including document repositories and the World Wide Web ("WWW") portion of the Internet. The mined information is then parsed and processed to generate a supply chain graph. Once a diagrammatic depiction of the supply chain graph for a company or industry is generated, value can be derived from the graph for analyzing and forecasting supply and demand of the resources, e.g., commodities, represented in the graph. Furthermore, the supply chain graph can be used to predict risk throughout the supply chain.

The term "commodity" as used in the present invention refers to any resources, materials, metals, minerals, energy, goods or services that may be supplied, delivered, traded, bartered, or exchanged to satisfy an individual, corporations, or industry's needs or wants. More specifically, a commodity may be any good that is actively traded in a spot or derivative market including, but not limited to, the Chicago Board of Trade ("CBOT"), Chicago Mercantile Exchange ("CME"), HoustonStreet Exchange, Intercontinental Exchange ("ICE"), Kansas City Board of Trade ("KCBT"), Nadex Exchange, New York Mercantile Exchange ("NYMEX"), and U.S. Futures Exchange ("USFE"). As used herein, commodity may refer to resources, industrial products, components, and agricultural products such as iron ore, crude oil, natural gas, diesel fuel, gasoline, ethanol, industrial chemicals, computer chips, coal, salt, sugar, tea, coffee beans, soybeans, aluminum, copper, rice, wheat, gold, silver, palladium, and platinum. Commodity as used herein may also refer to manufactured products, finished products, or services manufactured or provided by a first company and sold or provided to an other company for the purpose of the further manufacture of goods or provision of services.

In a first embodiment, the present invention provides a system comprising: a processor; a memory communicatively coupled to the processor; a program stored in the memory, the program comprising: an input and identification module ("IAIM") for permitting the receipt of a set of information, the IAIM comprising executable code adapted to determine whether the set of information contains data related to one or more of a supplier, a commodity, and a customer; and an instantiated query generation module ("IQGM") communicatively coupled to the IAIM for generating a query comprising a supplier entry, a commodity entry, and a customer entry, the IQGM comprising a placeholder generation module for inserting a placeholder into the query for one or more of: the supplier entry if the IAIM determines a supplier absence in the set of information; the commodity entry if the IAIM determines a commodity absence in the set of information; and the customer entry if the IAIM determines a customer absence in the set of information; a transceiver for sending the query and receiving a set of supply chain information; a supply chain generation module for generating a supply chain data structure based at least in part upon the set of supply chain information; and a transmitter for transmitting a signal comprising the supply chain data structure.

The system may also be characterized as follows. The supply chain data structure may be a supply chain visualization signal having a set of content associated with the set of supply chain information. The supply chain visualization signal may be adapted for use by a display to present a graphical representation of an aspect of a supply chain relationship. The IQGM may further comprise a supply chain graph module, the supply chain graph module connected to the supply chain visualization signal generation module. The IAIM may receive as input a set of company names C, a set of commodity types T, the IQGM further comprises a set of query templates Q and a set of relationship types R. The at least one query in the set of query templates Q may comprise the elements: "$\{c^1\}$ $\{r\}$ $\{t\}$ $\{c^2\}$"; wherein $c^1$ is a first entity name selected from the set of company names C, $c^2$ is a second entity name selected from the set of company names C, r is a relationship type selected from the set of relationship types R, t is a commodity type selected from the set of commodity types T, and the elements $c^1$, r, t, and $c^2$ are coupled with a linguistic indicia indicating a supply chain relationship. The query may comprise the elements: "$\{c^1\}$ $\{r\}$ $\{t\}$ $\{c^2\}$"; wherein $c^1$ is a first entity name, $c^2$ is a second entity name, r is a relationship type, t is a commodity type, and the elements $c^1$, r, t, and $c^2$ are coupled with a linguistic indicia indicating a supply chain relationship. The set of query templates Q may further comprise at least one instantiated query template q'. The set of supply chain visualization information may comprise a set of triples comprising a supplying entity, a commodity type, and a supplied entity. The supply chain visualization signal may comprise at least one graph node and at least one connecting vertex. The supply chain visualization signal may comprise a first node representing a supplying entity and a second node representing a customer entity and a connecting vertex representing a commodity type. Each placeholder may comprise a wildcard and the system may be adapted to generate and execute a plurality of instantiated queries based on one or more sets of data respectively associated with each wildcard. The execution of the plurality of instantiated queries may return a candidate result set.

In a second embodiment, the present invention provides a computer implemented method comprising: receiving by a computer a set of information; identifying by a computer one or more of a supplier, a commodity, and a customer from the set of information; generating by a computer an instantiated query comprising a supplier entry, a commodity entry, and a customer entry corresponding, respectively, to the identified supplier, commodity, and customer in the set of information; determining by a computer the absence of any of a supplier, a commodity, or a customer from the set of information and generating and inserting a placeholder for each item absent from the set of information; sending by a computer the query; receiving by a computer a set of supply chain information; generating by a computer a supply chain data structure based at least in part upon the received set of supply chain information; and transmitting by a computer the supply chain data structure.

In a third embodiment, the present invention provides a system comprising: a server comprising a processor adapted to execute code and a memory for storing executable code; an input adapted to receive a set of information over a communication network, the set of information derived from one or more remote data sources, the set of information including structured and unstructured data; a user interface executed by the processor to generate a supply chain visualization screen signal comprised of a plurality of data items, the user interface comprising: an input and identification module ("IAIM") when executed by the processor being adapted to permit the receipt of a set of information, the IAIM comprising executable code adapted to determine whether the set of information contains data related to a supplier, a commodity, and a customer, respectively; and an instantiated query generation module ("IQGM") communicatively coupled to the IAIM when executed by the processor being adapted to generate a query comprising a supplier entry, a commodity entry, and a customer entry, the IQGM comprising a placeholder generation module when executed by the processor being adapted to insert a placeholder into the query for one or more of: the supplier entry if the IAIM when executed by the processor determines a supplier absence in the set of information; the commodity entry if the IAIM when executed by the processor determines a commodity absence in the set of information; and the customer entry if the IAIM when executed by the processor determines a customer absence in the set of information; a transceiver being adapted to sending the query and receiving a set of supply chain information; a supply chain generation module when executed by the processor being adapted to generating a supply data structure based upon the set of supply chain information; and a transmitter being adapted to transmitting the supply chain data structure.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one manner the present invention utilizes a set of company names C, a set of commodity types T, and a set of Query Templates Q in performing supply chain analysis and generating supply chain visualizations. The invention utilizes fast access to a variety of data sources to search through a large collection of indexed text documents and other data sources including textual prose documents for which an inverted index has been constructed. In one embodiment of the present invention, a Web search engine (e.g. Bing, Google, DuckDuckGo) serves the function of giving fast access to an indexed document collection.

In one implementation, the process of generating a supply chain graph begins with receiving as input a list of companies, which may be represented as C={"Petrol S.A."; "BP plc."; "Cargill"; "Nestle"; "Gazprom"; . . . }. For each of these companies ($c^1$, $c^2$, . . . ) the present invention will determine which other company (supplier) from the list of companies supplies the company (customer) with a given commodity, good, or service, or other thing supplied by a supplier to a customer (interchangeably as a "commodity") for any given commodity type T={"oil"; "gas"; "beef"; "wheat"; "palm oil"; "crude" . . . }. Determining which companies supply a company with a given commodity type can be done by instantiating a query template q, for example: q="* supplies {Commodity} to {Company2}". In the preceding example the "*" serves as a wildcard placeholder for all potential companies that supply the Commodity to Company2. The placeholder is substituted, one company at a time, for all possible placeholders (companies and commodities) in the lists C (list of companies) and T (list of commodities) for all possible q (queries) in Q (the set of queries).

A particular instantiated query template is represented as q'. For example, the instantiated query template q'="* supplies oil to BP" where "oil" is substituted for Commodity and BP is substituted for Company2 (customer) is used to identify which companies from the list of companies C are returned by the particular instantiated query template. In one embodiment the instantiated query template q' may be sent to a search engine such as, but not limited to, Yahoo! BOSS, in order to obtain the top 1,000 results, i.e. documents, in which q' occurs. The symbol "*" functions as a wildcard placeholder variable in q'. This means that there is a token to the left of the word "supplies" which is unknown and is expected to be identified and retrieved by the search performed using the instantiated query q'. A search is them performed for the position in the document indicated by "*" of our query q' to extract text where the company name from the list of company names C is to the left, i.e., corresponding to the position of the placeholder "*". Each company found in this position ("*") for q' is a candidate result. A company that is identified as a candidate result is a potential supplier of Commodity for Company2. The relationship "supplier" used in this example in both q and q' may be substituted for any other commercial relationship that may exist between two companies involving a good or service.

The result of performing the search in an identified document using the instantiated query q' is a set of triples where, in one embodiment, the elements in each triple in the set of triples may be labeled, respectively, as "SupplyingEntity", "CommodityType", and "SuppliedEntity". For example, for the specific example of q' described above, a returned triple in the set of triples may be ("Marathon Oil Corporation"; "oil"; "BP"). The set of triples returned using the instantiated query q' can be used to construct a supply chain graph by turning each triple into two graph nodes, in this example for SupplyingEntity and SuppliedEntity respectively, which are connected using a vertex labeled with CommodityType. In the present example nodes are created for "Marathon Oil Corporation" (SupplyingEntity) and "BP" (SuppliedEntity) with an arc (directed line) connecting the nodes labeled "oil" (CommodityType).

Additional patterns for a single query template can be found in Table 1:

TABLE 1

| Queries "q" possible in Query Set "Q" | Query Configuration |
| --- | --- |
| "{Company1} supplies {Commodity} to {Company2}" | no wildcards, 3 variables |
| "* supplies {Commodity} to {Company2}" "{Company1} supplies * to {Company2}" "{Company1} supplies {Commodity} to *" | 1 wildcard, 2 variables |
| "* supplies * to {Company2}" "* supplies {Commodity} to *" "{Company1} supplies * to *" | 2 wildcards, 1 variable |
| "* supplies * to *" | 3 wildcards, no variables |

The set Q should use more than one query template to make the technique effective; in addition to "{Company1} supplies {Commodity} to {Company2}", for example, "{Company1} is a supplier of {Commodity} to {Company2}", "{Company1} is a vendor of {Commodity} to {Company2}", "{Company1} delivers {Commodity} to {Company2}" etc. are all possible elements of Q. Relationship types or terms used in the query template may include, for example, supplies, delivers, produces, manufactures, mines, extracts, ships, refines, distills, receives, or other terms such that when used in connection with a string such as "{relationship type} {Commodity} {Company1} for {Company2}" or "{Company1} {relationship type} {Commodity} {Company2}" it indicates a supply relationship between companies. In addition, any preposition such as "to", "for", "by", or "with" may be used in the query to indicate the type of supply relationship involved between the companies. In addition to the query formats described in Table 1, above, the query may also take many different forms, e.g., "{Commodity} supplied by * to {Company2}", or "{Company1} receives {Commodity} from *".

In one implementation of the present invention the frequency of which one triple can be extracted from the top k (e.g., k=1,000) search engine results is counted, summing up the counters over all variant patterns of all templates. The higher the count (which may be normalized by the number of hits of a search for +{Company1}+{Company2}), the higher the confidence that the triple extracted is correct.

One method for pattern-based mining to mine risk exposure for companies can be found in the paper by Leidner, J. L. and F. Schilder (2010), entitled "Hunting the Black Swan: Risk Mining From Text," Demo Paper, *Proceedings of the Annual Meeting of the Association for Computational Linguistics (ACL)*, Sweden, the contents of which is incorporated herein by reference in its entirety.

Figure 1:
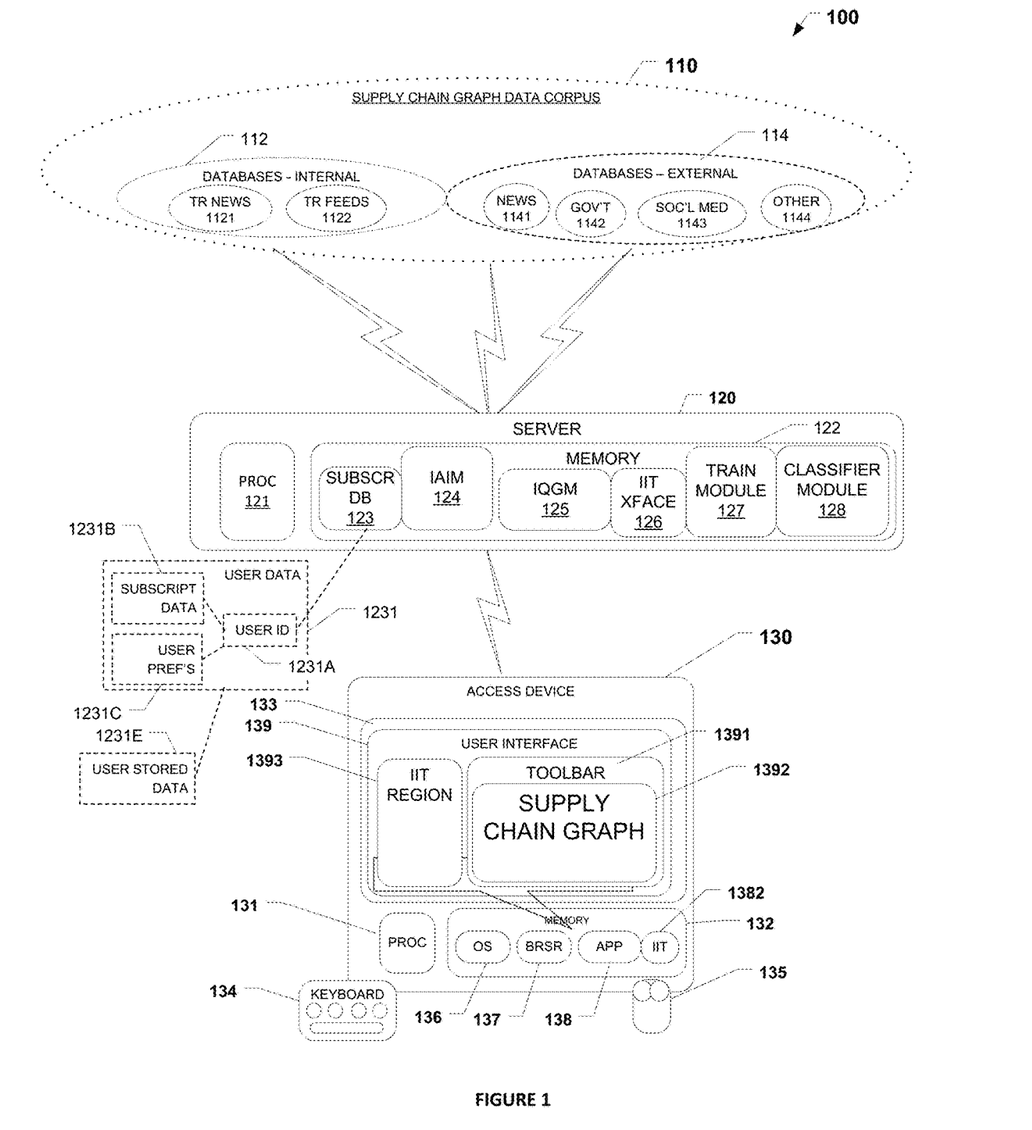
FIG. 1 is a schematic diagram of a client-server architecture for providing the SCG system according to the present invention.
Figure 2:
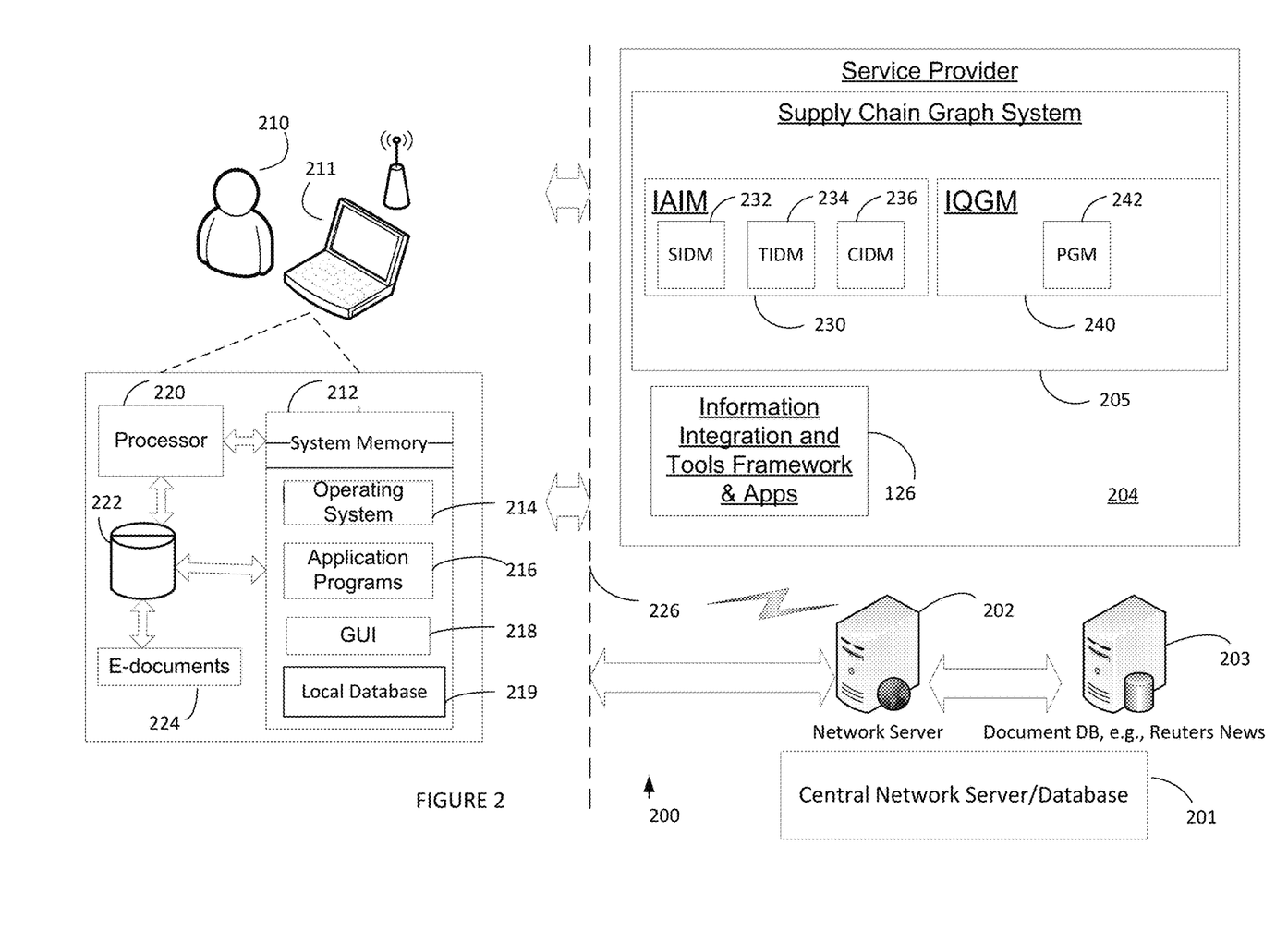
FIG. 2 is a schematic of a device for generating a supply chain visualization according to the invention.

FIGS. 1 and 2 illustrate exemplary embodiments of the overall process of the present invention. FIG. 1 is a schematic diagram of a client/server/database architecture associated with one implementation of the SCGS of the present invention. With reference to FIG. 1, the present invention provides a Supply Chain Graph System ("SCGS") 100 that accesses information, collectively referred to at 110 as global supply chain information, news/media and other content database(s). SCGS 100 is adapted to automatically collect and process internal and external sources of information (112, 114) relevant in collecting supply chain graph information to be used to generate supply chain graphs. Server 120 is in electrical communication with Supply Chain Graph System (SCGS) databases 110, e.g., over one or more or a combination of Internet, Ethernet, fiber optic or other suitable communication means. Server 120 includes a processor 121 and a memory 122, in which is stored executable code and data, including a subscriber (e.g., EIKON) database 123, an Input and Identification Module ("IAIM") 124, Instantiated Query Generation Module ("IQGM") 125, a user-interface module 126, a training/learning module 127 and a classifier module 128. Processor 121 includes one or more local or distributed processors, controllers, or virtual machines. Memory 122, which takes the exemplary form of one or more electronic, magnetic, or optical data-storage devices, stores non-transitory machine readable and/or executable instruction sets for wholly or partly defining software and related user interfaces for execution of the processor 121 of the various data and modules 123-128.

Quantitative analysis, techniques or mathematics and models associated with modules 124 to 128 in conjunction with computer science are processed by processor 121 of server 120 thereby rendering server 120 into a special purpose computing machine use to transform records and data related to commodity transactions found in documents and other information in SCGS databases 110 into supply chain graph representations and to arrive at predictive behavior, and potentially predictive representations, for use by business analysts. This may include generating a set of queries used to identify a set of triples used in generating supply chain graphs. The SCGS 100 automatically accesses and processes data concerning commodities, vessels, tenders, and fixtures, along with supplemental data such as weather, political and other subjects that may affect commodity availability and pricing.

The SCGS 100 of FIG. 1 includes an Input and Identification Module ("IAIM") 124 adapted to permit the receipt of a set of information including supplier, commodity and customer data sets. The IAIM 124 further comprises a supplier identification module, a commodity identification module, and a customer identification module for identifying supplier, commodity, and customer related data, respectively, contained in the set of information. The SCGS 100 also includes an Instantiated Query Generation Module ("IQGM") 125 communicatively coupled to the IAIM 124 for generating a query comprising a supplier entry, a commodity entry, and a customer entry. The IQGM 125 further comprises a placeholder generation module for inserting a placeholder into the query to represent one or more elements of the query −q. For example, a placeholder may be inserted into the query to represent the supplier entry if the supplier identification module determines a supplier absence in the set of information. In addition, the commodity entry may be represented in the query by a placeholder if the commodity identification module determines a commodity absence in the set of information. Likewise the customer entry may be represented in the query by a placeholder if the customer identification module determines a customer absence in the set of information.

The SCGS 100 may include a training or learning module 127 that analyzes past or archived commodity and supply chain data, and may include use of a known training set of data, and may update historical information. In this manner the SCGS may be adapted to build and generate a supply chain graph based on recent events in the marketplace, e.g., price of semiconductors rises if the supply of materials necessary in the manufacture of semiconductors is short or if delivery of such materials is canceled or delayed.

In one exemplary implementation, the SCGS 100 may be operated by a traditional financial services company, e.g., Thomson Reuters, wherein SCGS database corpus or set 110 includes internal databases or sources of content 112, e.g., TR News 1121, and TR Feeds 1122. In addition, SCGS database set 110 may be supplemented with external sources 114, freely available or subscription-based, as additional data considered by the SCGS and/or predictive model. News database or source 1141 may be a source for confirmed facts, e.g., explosion on an oil rig results in shortage of a commodity and result in increase in demand and price for remaining available supplies. Also, government/regulatory filings database or source 1142, social media and blogs 1143, as well as other sources 1144, provide data to the SCGS system for generating and monitoring and updating information related to availability and pricing of a commodity. This data changes over time and the SCGS may be used to enhance investment and trading strategies and enable users to track and spot new opportunities in a changing market.

In one embodiment the SCGS 100 may include a training or machine learning module 128 adapted to derive insight from a broad corpus of commodity-related data. The historical database or corpus may be separate from or derived from SCGS database set 110, which may comprise continuous feeds and may be updated, e.g., in near or close to real time, allowing the SCGS to automatically and timely analyze content, update supply chain visualizations based on "new" content, and generate commodity trade or predictive signals in close to real-time, i.e., within approximately one second. However, the wider the scope of data used in connection with the SCGS, the longer the response time may be. To shorten the response time, a smaller window/volume of data/content may be considered. The SCGS may include the capability of generating and issuing timely intelligent alerts and may provide a portal allowing users, e.g., subscription-based analysts, to access not only the supply chain visualizations and related tools and resources but also additional related and unrelated products, e.g., other Thomson Reuters products.

Content may be received as an input to the SCGS 100 in any of a variety of ways and forms and the invention is not dependent on the nature of the input. Depending on the source of the information, the SCGS will apply various techniques to collect information relevant to commodities and supply chains. For instance, if the source is an internal source or otherwise in a format recognized by the SCGS, then it may identify content related to a particular company or sector or index based on identifying a field or marker in the document or in metadata associated with the document. If the source is external or otherwise not in a format readily understood by the SCGS, it may employ natural language processing (NLP) and other linguistics technology to identify commodities and companies in the text as well as terms that indicate the existence of a supply chain relationship.

The SCGS 100 may be implemented in a variety of deployments and architectures. SCGS data can be delivered as a deployed solution at a customer or client site, e.g., within the context of an enterprise structure, via a web-based hosting solution(s) or central server, or through a dedicated service, e.g., index feeds. FIG. 1 shows one embodiment of the SCGS as comprising an online client-server-based system adapted to integrate with either or both of a central service provider system or a client-operated processing system, e.g., one or more access or client devices 130. In this exemplary embodiment, SCGS 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110 or the service. In the exemplary embodiment, subscriber database 123 includes user data (or more generally user) as data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the services accessed and distributed via SCGS 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display 133, a keyboard 134, and a graphical pointer or selector 134. Processor module 131 includes one or more processors, processing circuits, or controllers. Memory 132 stores code (machine-readable or executable instructions) for an operating system 136, a browser 137, supply chain graph software 138, and interactive interface tools (IIT) 1382. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon launching processing software an integrated information-retrieval graphical-user interface 139 is defined in memory 132 and rendered on display 133. Upon rendering, interface 139 presents data in association with one or more interactive control features such as user interface tools region 1393, toolbar 1391, and Supply Chain Graph System interface 1392. The interface 1392 may be incorporated into, comprise, or consist of a variety of existing software solutions or GUIs, such as those found in U.S. patent application Ser. No. 13/423,127, filed Mar. 16, 2012, and entitled METHODS AND SYSTEMS FOR RISK MINING AND FOR GENERATING ENTITY RISK PROFILES (Leidner et. al.); U.S. patent application Ser. No. 13/423,134, filed Mar. 16, 2012, and entitled METHODS AND SYSTEMS FOR GENERATING ENTITY RISK PROFILES AND FOR PREDICTING BEHAVIOR OF SECURITY (Leidner et al.); U.S. patent application Ser. No. 13/594,864, filed Aug. 26, 2012, and entitled METHODS AND SYSTEMS FOR MANAGING SUPPLY CHAIN PROCESSES AND INTELLIGENCE (Siig et. al.); all of which have been incorporated by reference herein in their entirety.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to Internet-Protocol (IP) address for an online information-retrieval system, such as offerings from Thomson Reuters Financial and other systems, and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server, such as one operated by a financial services customer, may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneous invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

FIG. 2 illustrates another representation of an exemplary SCGS system 200 for carrying out the herein described processes that are carried out in conjunction with the combination of hardware and software and communications networking. In this example, SCGS 200 provides a framework for searching, retrieving, analyzing, and ranking SCGS 200 may be used in conjunction with a system 204 offering of an information or professional financial services provider (FSP), e.g., Thomson Reuters Financial, and include an Information Integration and Tools Framework and Applications module 126, as described hereinabove. Further, in this example, system 200 includes a Central Network Server/Database Facility 201 comprising a Network Server 202, a Database 203 of documents and information, from internal and/or external sources, e.g., news stories, blogs, social media, etc., an Supply Chain Graph System 205 having as components an IAIM 230 comprising supplier identification module ("SIDM") 232, commodity identification module ("TIDM") 234, and customer identification module ("CIDM") 236, and an IQGM 240 comprising placeholder generation module ("PGM") 242.

The Central Facility 201 may be accessed by remote users 210, such as via a network 226, e.g., Internet. Aspects of the system 200 may be enabled using any combination of Internet or (World Wide) WEB-based, desktop-based, or application WEB-enabled components. The remote user system 210 in this example includes a GUI interface operated via a computer 211, such as a PC computer or the like, that may comprise a typical combination of hardware and software including, as shown in respect to computer 211, system memory 212, operating system 214, application programs 216, graphical user interface (GUI) 218, processor 220, and storage 222, which may contain electronic information 224 such as electronic documents and information, e.g., commodity and/or industry reports, and company related reports and information.

The methods and systems of the present invention, described in detail hereafter, may be employed in providing remote users, such as investors, access to a searchable database. In particular, remote users may search a database using search queries based on company RIC, a commodity listing, stock or other name to retrieve and view predictive analysis and/or suggested action as discussed hereinbelow. RIC refers to Reuters instrument code, which are ticker-like codes used to identify financial instruments and indices, are used for looking up information on various financial information networks (like Thomson Reuters market data platforms, e.g., Bridge, Triarch, TIB and RMDS—Reuters Market Data System (RMDS) open data integration platform). Client side application software may be stored on machine-readable medium and comprising instructions executed, for example, by the processor 220 of computer 211, and presentation of web-based interface screens facilitate the interaction between user system 210 and central system 211, such as tools for further analyzing the data streams and other data and reports received via network 226 and stored locally or accessed remotely. The operating system 214 should be suitable for use with the system 201 and browser functionality described herein, for example, Microsoft Windows 8, Windows Vista (business, enterprise and ultimate editions), Windows 7, or Windows XP Professional with appropriate service packs. The system may require the remote user or client machines to be compatible with minimum threshold levels of processing capabilities, e.g., Intel i3, i5, i7, speed, e.g., 1-2 GHz, minimal memory levels and other parameters.

The configurations thus described are ones of many and are not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 81™, 10G™, or some other suitable database application may be used to manage the data. These tables may be organized into an RDS or Object Relational Data Schema (ORDS), as is known in the art.

Figure 3:
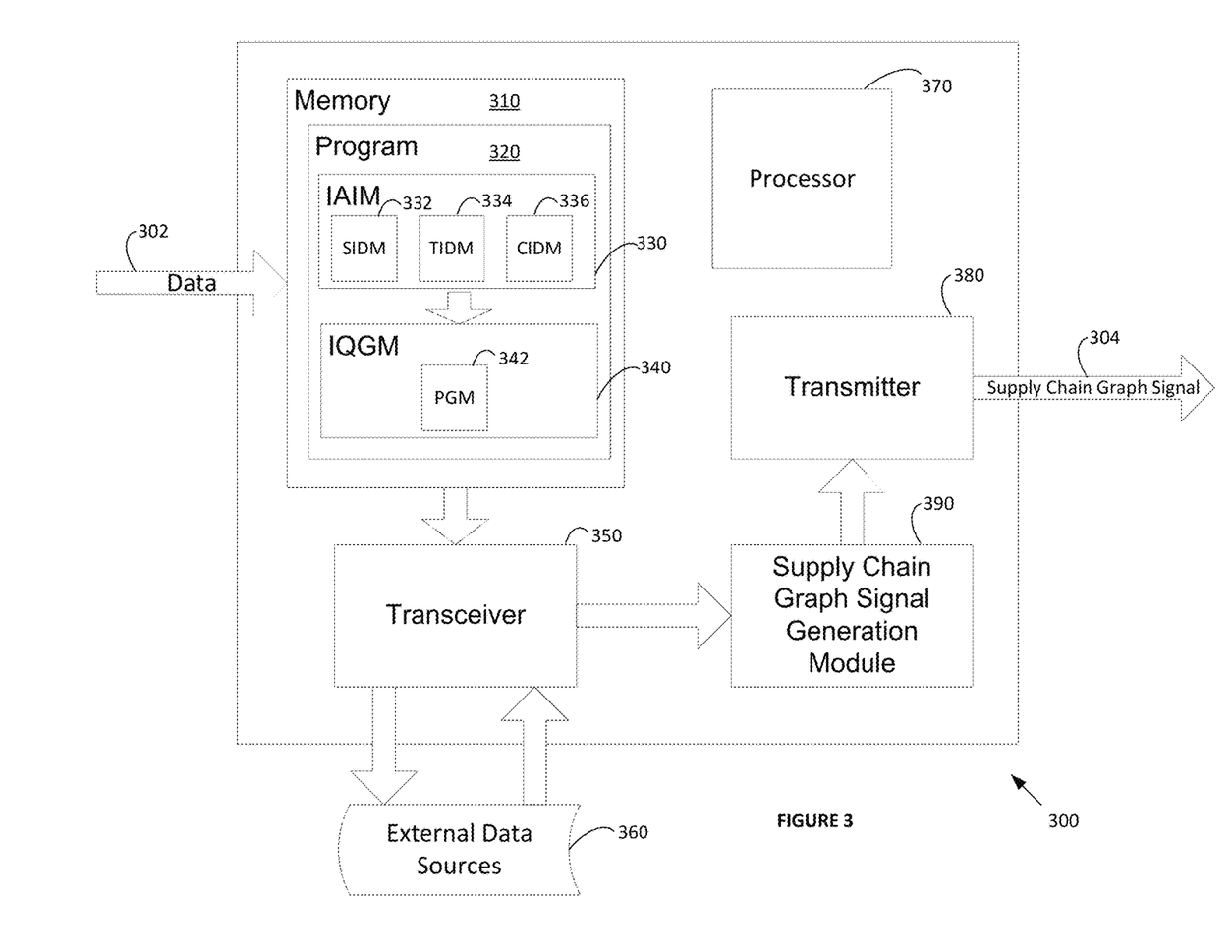
FIG. 3 is a schematic diagram of an alternate embodiment of a device for generating a supply chain visualization according to the invention.

FIG. 3 depicts another embodiment of the SCGS system 300 as embodied on a client computer system. The SCGS system 300 is comprised of a processor 370, a memory 310, a transceiver 350, a supply chain graph signal generation module ("SCGSGM") 390 and a transmitter 380. A program 320 stored in the memory 310 is comprised of an Input and Identification Module ("IAIM") 330 and an Instantiated Query Generation Module ("IQGM") 340. The IAIM 330 is further comprised of a supplier identification module ("SIDM") 332, a commodity identification module ("TIDM") 334, and a customer identification module ("CIDM") 336. The IQGM 340 is further comprised of the placeholder generation module 342. One or more external data sources 360 are communicatively connected to the transceiver 350.

A signal in the form of input data 302 is first received by the system and parsed by the IAIM 330. The IAIM 330 and its modules SIDM 332, TIMD 334, and CIDM 336 parse the input data to identify a set of supplier entity names, commodities, and customer entity names. A corpus of predefined training data, including a set of company names and/or a set of commodity types, or other methods may be used to preload or train the IAIM 330 with data used in identifying supplier entity names, commodities, and customer entity names. Once supplier entity names, commodities, and customer entity names have been identified by the IAIM 330, the IQGM 340 uses a set of query templates to generate a query using the supplier entity names, commodities, and customer entity names identified by the IAIM 330. The placeholder generation module 342 may be used to substitute one or more placeholder(s) into the query where no supplier entity name, commodity type, or customer entity name was identified.

The IQGM 340 sends the instantiated query to the transceiver 350 where the query is executed or submitted. A search using the instantiated query may be run on external data sources 360. In one embodiment, the search is performed on a search engine, such as, but not limited to Yahoo! BOSS, to obtain the top 1,000 results containing the query parameters. The search results are returned from external data sources 360 to transceiver 350. Each commodity type or company name returned by the query is a candidate result. The set of results returned by the search are converted into a set of triples. The set of triples contains a supplier entity, a commodity type, and a customer entity. The set of triples is then used by SCGSGM 390 to construct a supply chain graph. In one exemplary implementation, the supply chain graph is generated by turning each of the supplier entity and customer entity into two graph nodes. The nodes are connected by a vertex labeled with the commodity type. The supply chain graph may use additional nodes and vertices by additional triples from the set of triples to the graph. The process of adding triples to the graph builds out a comprehensive supply chain graph that provides a user with an enhanced tool and experience in analyzing and forecasting supply and demand. The resulting supply chain graph signal generated by SCGSGM 390 is sent to transmitter 380 to be sent as supply chain graph signal 304.

Figure 4:
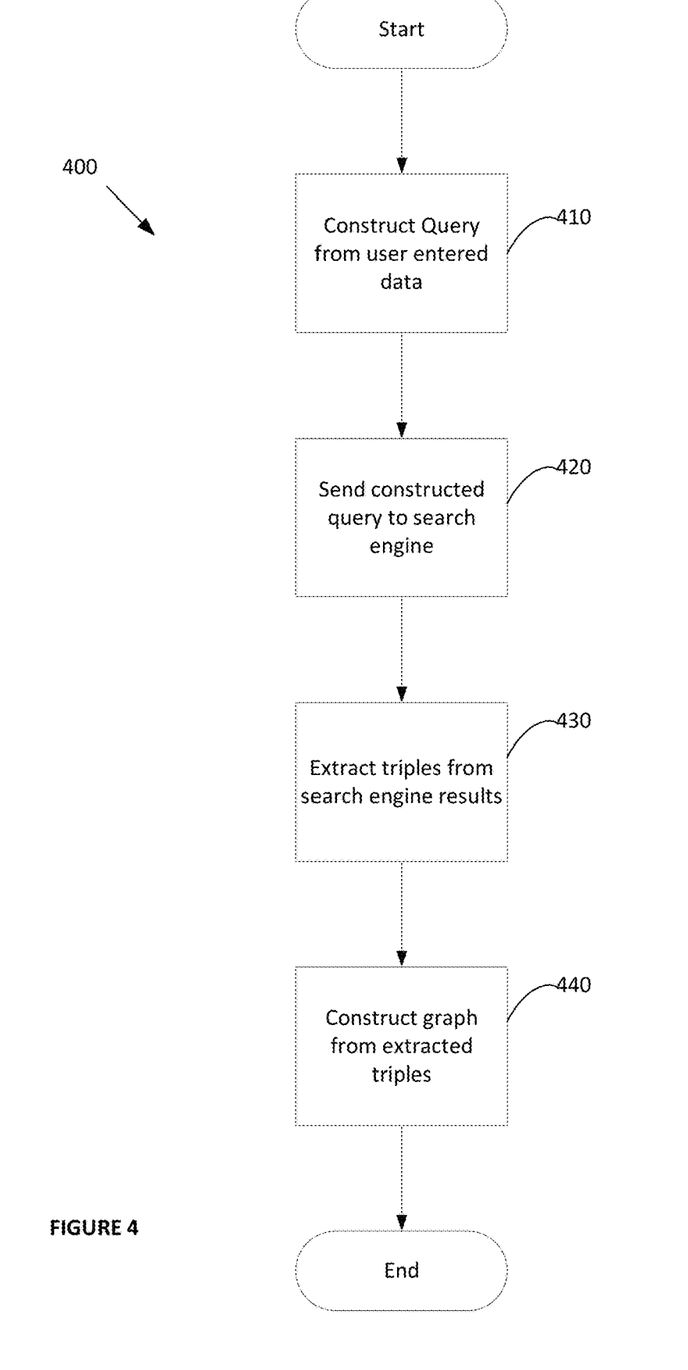
FIG. 4 is a flowchart depicting a process for generating a supply chain visualization according to the invention.

With reference now to FIG. 4, a flowchart depicts the process 400, showing the steps involved in one embodiment of the invention. The process begins at step 410 with the input of query data into the system by the user. The query data input by the user is formatted into a supply chain query to be used in obtaining supply chain information. The formatted query is then sent in step 420 to a search engine or external data source. The query is used to perform a search to locate and identify data requested by the user. In operation multiple queries comprising essentially common elements (company, commodity, linguistic relationship terms) but having different formats may be executed. For example, the user may wish to identify all commodities supplied by BP to Shell Oil. The user would enter in the data "BP" as the supplying entity and "Shell Oil" as the customer entity in step 410. One query format that would be constructed would be in the form "BP supplies * to Shell Oil" wherein the "*" serves as a placeholder in the exemplary query. A second query format could be "Shell Oil receives * from BP." A candidate result in step 420 for this query would be any commodity that satisfies the conditions of the query for "*", e.g., "natural gas" is a possible result for "BP supplies 'natural gas' to Shell Oil" or "Shell Oil receives 'natural gas' from BP." At step 430, sets of triples are extracted from the search engine results. In the above example, one triple would be "BP, natural gas, Shell Oil." The full set of triples would comprise all results returned by the execution of the query or set of queries on the search engine. At step 440 the search results are used to generate a supply chain graph. The supply chain graph is generated by turning each of the supplier entity and customer entity into two graph nodes. The nodes are connected by a vertex labeled with the commodity type. The supply chain graph may use additional nodes and vertices by additional triples from the set of triples to the graph. The resulting graph may be displayed to the user in either a graphical user interface or may be stored in memory to be used for other purposes.

Figure 5:
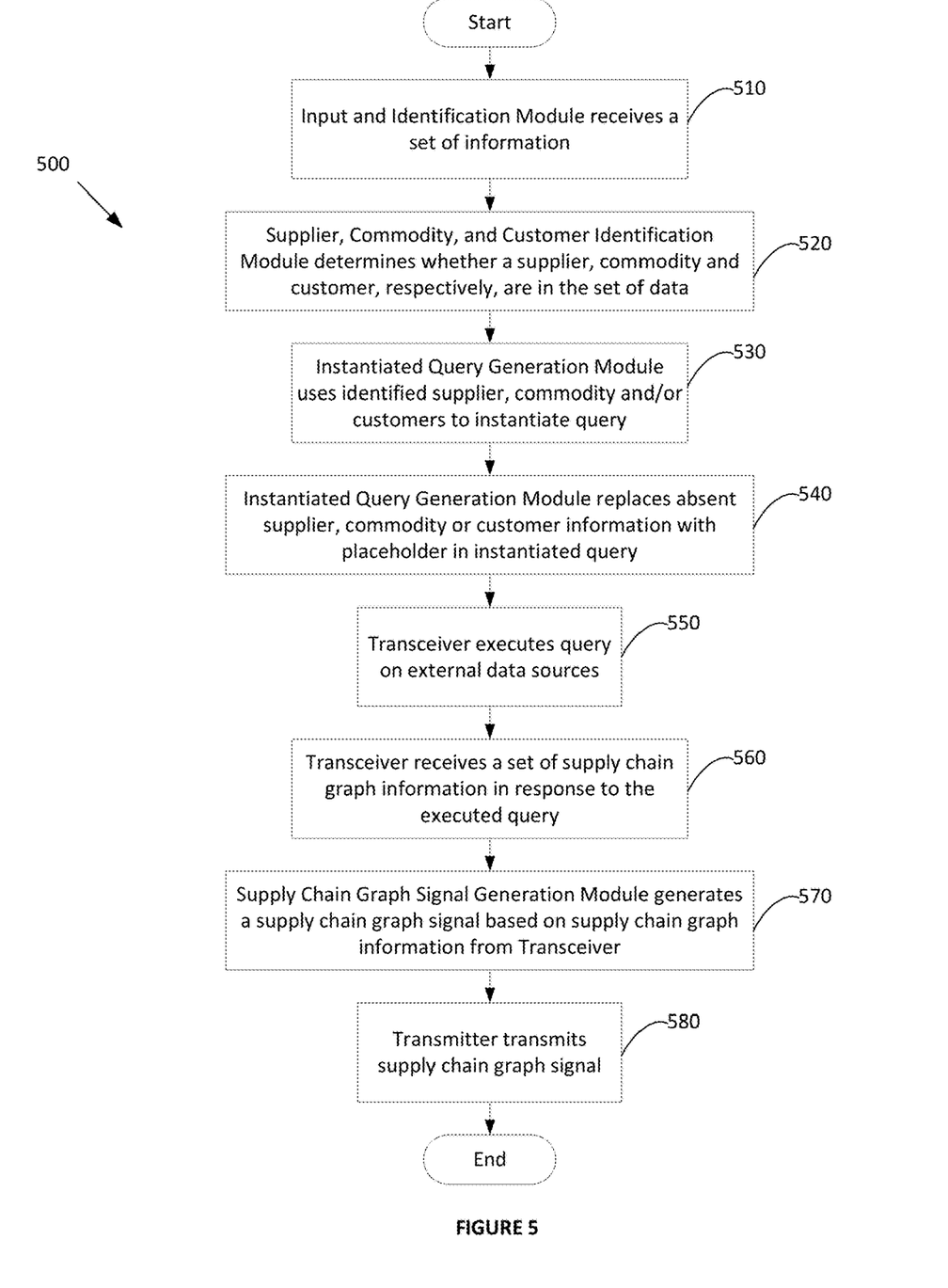
FIG. 5 is a flowchart depicting an alternate embodiment of a process for generating a supply chain visualization according to the invention.

With reference now to FIG. 5, a flowchart depicts the process 500, showing the steps involved in one embodiment of the invention. The process 500 begins with an input and identification module receiving a set of information in step 510. The information received by the input and identification module may include both unstructured and structured data from a variety of data sources. The supplier, commodity, and customer identification module in step 520 determines whether supplier entity names, commodity types, and customer entity names are found within the set of data. Step 520 may involve using a set of company names and a set of commodity types in addition to other data to identify supplier entity names, commodity types, and customer entity names within the set of data. For example, a user may select or define a set of companies of interest and/or a set of commodities of interest against which the user desires to apply the SCGS process. Alternatively, the set may comprise a set of companies common to an area or industry of interest.

In step 530, an instantiated query generation module then uses the identified suppliers, commodities, and/or customers identified in the set of data to generate an instantiated querying using a query template from a set of query templates. The instantiated query may contain missing supplier entity names, commodity types, and customer entity names; if so, the instantiated query generation module will replace missing information with placeholders, which may be in the form of wildcards, in the instantiated query in step 540. The instantiated query is sent to a transceiver in step 550, where it is then executed on external data sources. In one embodiment, a search engine is used to return the top 1,000 results for the instantiated query. The set of results is received by the transceiver in step 550 as a set of supply chain information in response to the query. In step 560, a supply chain graph signal generation module generates a supply chain graph signal using the supply chain graph information from the transceiver. The supply chain graph signal is generated from a set of triples extracted from the supply chain graph information. The set of triples contains triples comprised of a supplier, a customer, and a commodity type. The supply chain graph signal is generated by turning each of the supplier entity and customer entity into two graph nodes. The nodes are connected by a vertex labeled with the commodity type. The supply chain graph may use additional nodes and vertices by adding additional triples from the set of triples to the graph. The resulting graph is then displayed to the user by the transmitter in step 580 as either a visual representation in a graphical user interface or may be stored in memory to be used for other purposes.

Figure 6:
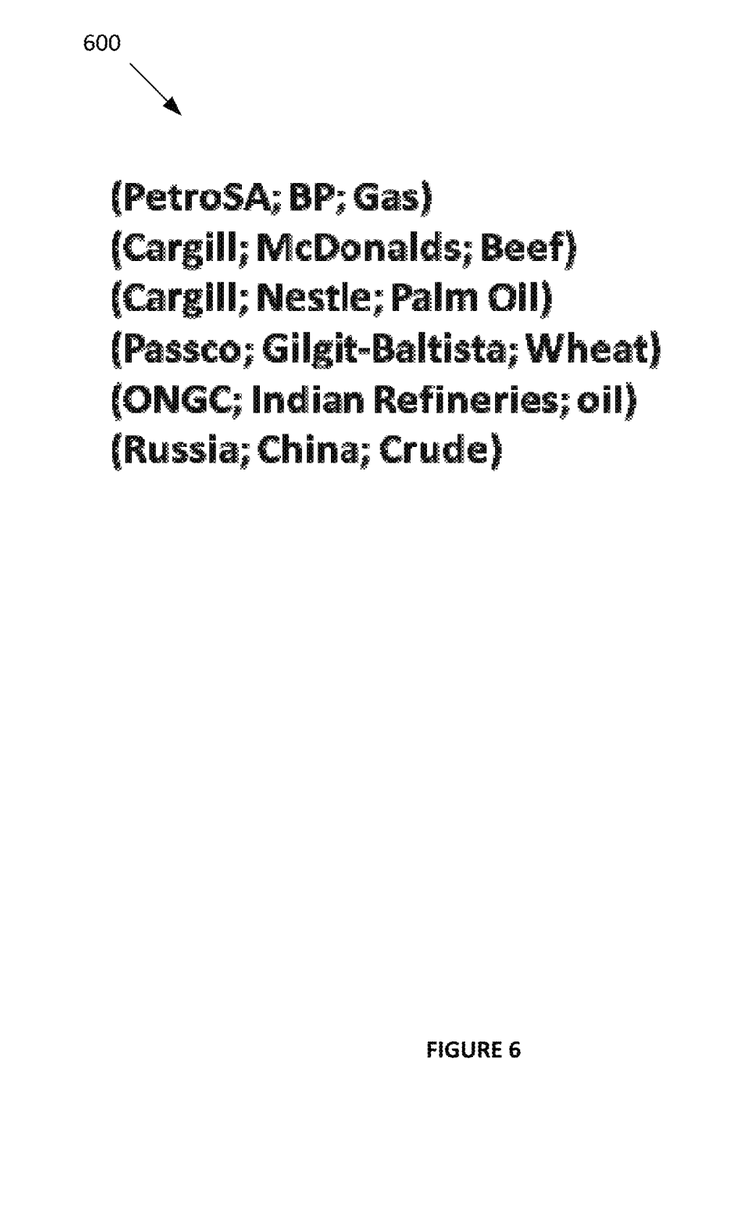
FIG. 6 is a depiction of sets of triples to be used for the generation of a supply chain visualization according to the invention.

FIG. 6 depicts an exemplary embodiment of a set of triples 600 that may be returned as the result of an executed instantiated query. Each triple in the set of triples comprises a supplying entity, a customer entity, and a commodity type. Each triple in the set of triples 600 may be used to generate separate supply chain graphs. In addition, sets of triples with common elements, (Cargill; McDonalds; Beef) and (Cargill; Nestle; Palm Oil) for example, may be used to generate a single supply chain graph showing the commodity and supply relationships between multiple companies. The use of more than one triple in generating a supply chain graph will provide a more complete picture of the market environment and will assist the user in making determinations about risk in the supply chain and in analyzing and forecasting the supply and demand of resources represented in the graph. The graph or visualization may show an interrelationship among a plurality of commodity types and companies with a company being a supplier of a first commodity and a customer or recipient of an other commodity, e.g., a received commodity used in generating the supplied commodity.

Figure 7:
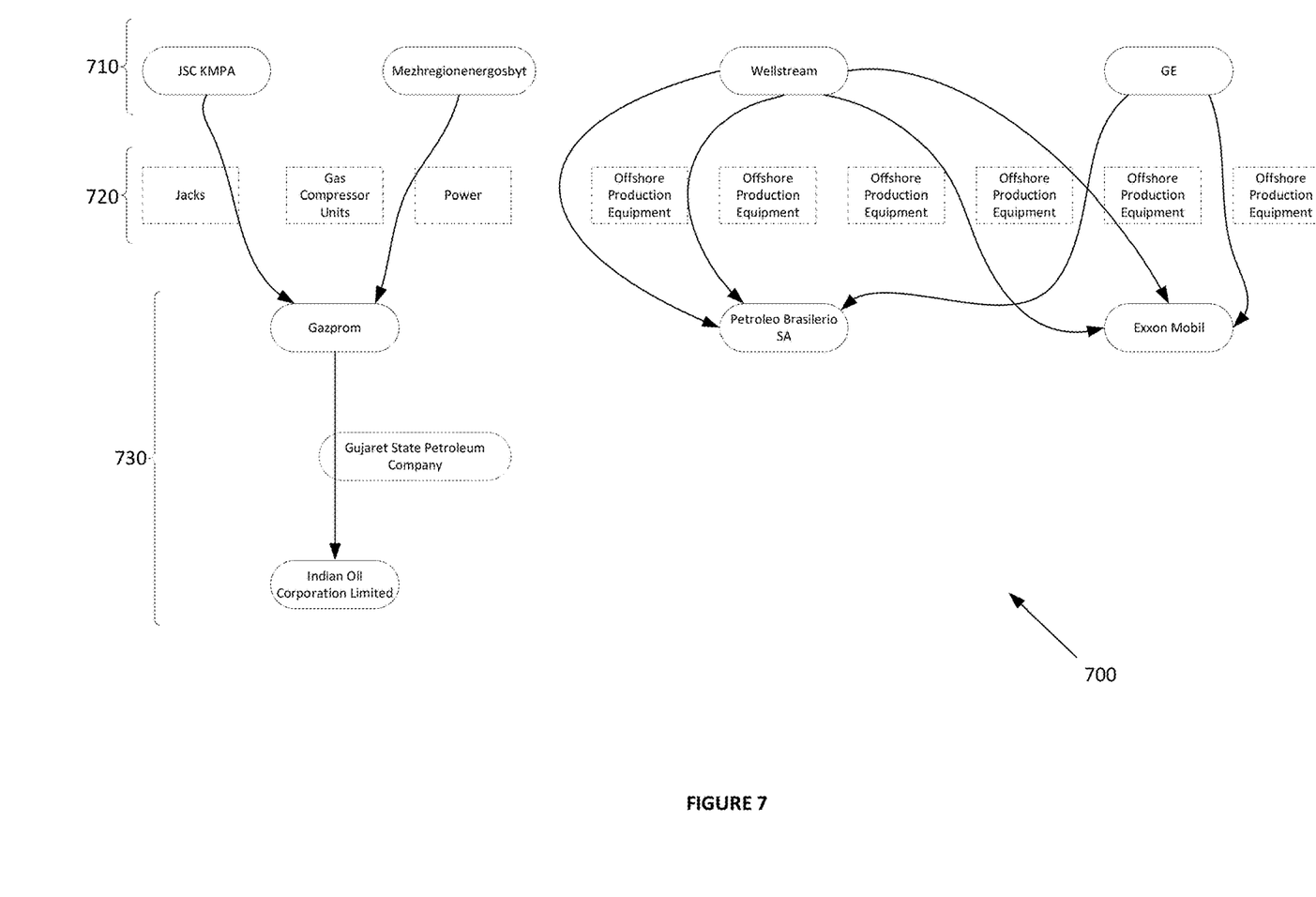
FIGS. 7 and 8 depict exemplary embodiments of supply chain visualizations generated according to the invention.

With reference now to FIG. 7, a first embodiment of a supply chain graph 700 is depicted. The supply chain graph 700 shows the interrelationship of a set of supplying entities 710, commodity types 720, and customer entities 730. Each customer and supplier entity is represented as a graphical node on the graph. Each node is then connected to another node using a vertex. The vertices represent the supplier/customer relationship of two entities. In the supply chain graph 700, the commodity type supplied from a supplier entity 710 to a customer entity 730 is shown by a vertex passing through a commodity type node 720. For example, 'JSC KMPA' supplies 'jacks' to 'Gazprom." The graph also shows that 'Gazprom' sends the 'jacks' to 'Indian Oil Corporation Limited' through 'Gujaret State Petroleum Company.' Multiple relationships involving may triples from a set of triples returned as the result of a search using an instantiated query can be shown on a single graph. The supply chain graph 700 uses at least 9 triples to show the relationships of the suppliers 710, the commodity types 720, and the customer entities 730.

Figure 8:
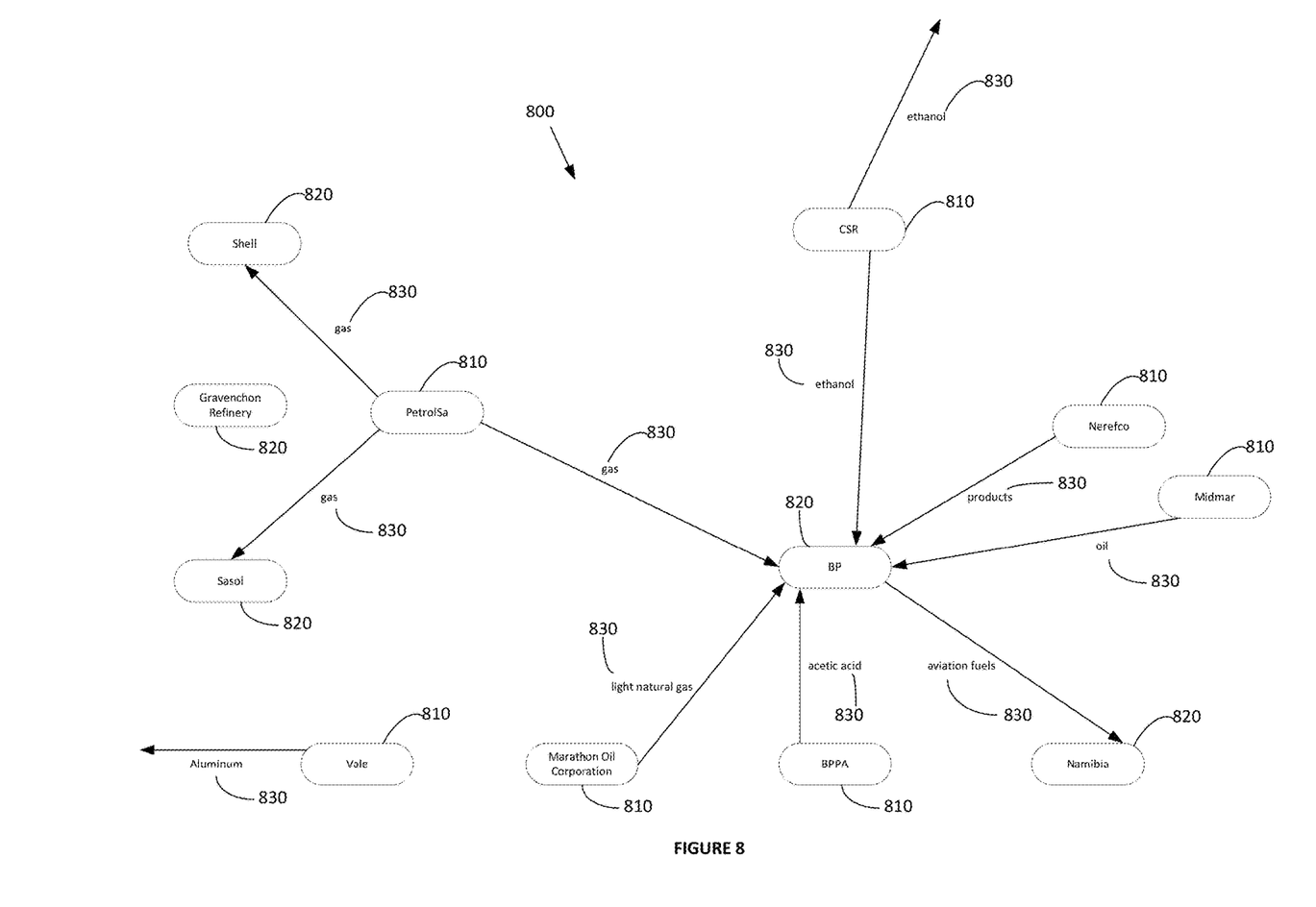

With reference now to FIG. 8, a second embodiment of a supply chain graph 800 is depicted. Supply chain graph 800 depicts an embodiment of a supply chain graph involving 11 triples to display the complete supplier and customer relationships returned using queries generated by the present invention. The set of triples returned by an instantiated query depict the interrelationships of 12 companies and 8 different commodity types. The set of commodity types 830 are shown as labels on vertices connecting the set of supplier entities 820 and the set of customer entities 820. In the supply chain graph 800 one such triple used would be (CSR; ethanol; BP), wherein CSR is the supplier, ethanol is the commodity type, and BP is the customer. The graph may be further annotated with the type of relationship between the customer and supplier shown on the vertex. For example, with respect to CSR and BP, the vertex "ethanol" may be further annotated with "manufactures for" or "processes for" to indicate how CSR and BP are related through ethanol. Additional triple may be added to the graph to further expand on the scope and give a clearer picture of the entities and commodity types involved.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A system comprising:
   a. a processor;
   b. a memory communicatively coupled to the processor;
   c. a program stored in the memory, the program comprising:
      i. an input and identification module ("IAIM") for permitting the receipt of a set of information, the IAIM comprising executable code adapted to parse and analyze the set of information to determine whether the set of information contains data related to one or more of a supplier, a commodity, and a customer; and
      ii. an instantiated query generation module ("IQGM") comprising a set of query templates Q, and wherein at least one query template q in the set of query templates Q comprises the elements: "$\{c^1\}$ $\{r\}$ $\{t\}$ $\{c^2\}$"; wherein $c^1$ is a first entity name, $c^2$ is a second entity name, r is a relationship type, t is a commodity type, and the elements $c^1$, r, t, and $c^2$ are coupled with a linguistic indicia indicating a supply chain relationship; the IQGM communicatively coupled to the IAIM for automatically generating by the IQGM a query based on the query template q from the set of query templates Q comprising a supplier entry, a commodity entry, and a customer entry, the IQGM comprising a placeholder generation module for automatically inserting a placeholder into the query for one or more of:
         1. the supplier entry if the IAIM determines a supplier absence in the set of information;
         2. the commodity entry if the IAIM determines a commodity absence in the set of information; and
         3. the customer entry if the IAIM determines a customer absence in the set of information;
      iii. the IQGM further adapted to determine a confidence in the query by numerically quantifying results of executing the query on at least one search engine;

d. a transceiver for sending the query and receiving a set of supply chain information;
e. a supply chain generation module for generating a supply chain data structure based at least in part upon the set of supply chain information; and
f. a transmitter for transmitting a signal comprising the supply chain data structure.

2. The system of claim 1 wherein the signal comprising the supply chain data structure is a supply chain visualization signal having a set of content associated with the set of supply chain information.

3. The system of claim 2 wherein the supply chain visualization signal is adapted for use by a display to present a graphical representation of an aspect of a supply chain relationship.

4. The system of claim 1 wherein the IQGM further comprises a supply chain graph module, the supply chain graph module connected to the supply chain visualization signal generation module.

5. The system of claim 1 wherein the IAIM receives as input a set of company names C, a set of commodity types T, the IQGM further comprises a set of relationship types R.

6. The system of claim 5 wherein $c^1$ is selected from the set of company names C, $c^2$ is selected from the set of company names C, r is selected from the set of relationship types R, and t is selected from the set of commodity types T.

7. The system of claim 5 wherein the set of query templates Q further comprises at least one instantiated query template q'.

8. The system of claim 1 wherein the set of supply chain information comprises a set of triples comprising a supplying entity, a commodity type, and a supplied entity.

9. The system of claim 2 wherein the supply chain visualization signal comprises at least one graph node and at least one connecting vertex.

10. The system of claim 9 wherein the supply chain visualization signal comprises a first node representing a supplying entity and a second node representing a customer entity and a connecting vertex representing a commodity type.

11. The system of claim 1 wherein each placeholder comprises a wildcard and the system is adapted to generate and execute a plurality of instantiated queries based on one or more sets of data respectively associated with each wildcard.

12. The system of claim 11 wherein execution of the plurality of instantiated queries returns a candidate result set.

13. A system comprising:
a server comprising a processor adapted to execute code and a memory for storing executable code;
an input adapted to receive a set of information over a communication network, the set of information derived from one or more remote data sources, the set of information including structured and unstructured data;
a user interface executed by the processor to generate a supply chain visualization screen signal comprised of a plurality of data items, the user interface comprising:
an input and identification module ("IAIM") when executed by the processor being adapted to permit the receipt of a set of information, the IAIM comprising executable code adapted to parse and analyze the set of information to determine whether the set of information contains data related to a supplier, a commodity, and a customer, respectively; and
an instantiated query generation module ("IQGM") communicatively coupled to the IAIM when executed by the processor being adapted to automatically generate by the IQGM a query comprising a supplier entry, a commodity entry, and a customer entry, wherein the query comprises the elements: "$\{c^1\}$ $\{r\}$ $\{t\}$ $\{c^2\}$";
wherein $c^1$ is a first entity name, $c^2$ is a second entity name, r is a relationship type, t is a commodity type, and the elements $c^1$, r, t, and $c^2$ are coupled with a linguistic indicia indicating a supply chain relationship;
the IQGM comprising a placeholder generation module when executed by the processor being adapted to automatically insert a placeholder into the query for one or more of:
the supplier entry if the IAIM when executed by the processor determines a supplier absence in the set of information;
the commodity entry if the IAIM when executed by the processor determines a commodity absence in the set of information; and
the customer entry if the IAIM when executed by the processor determines a customer absence in the set of information;
the IQGM further adapted to determine a confidence in the query by numerically quantifying results of executing the query on at least one search engine;
a transceiver being adapted to sending the query and receiving a set of supply chain information;
a supply chain generation module when executed by the processor being adapted to generating a supply data structure based upon the set of supply chain information; and
a transmitter being adapted to transmitting the supply chain data structure.

* * * * *